(12) United States Patent
Fattal

(10) Patent No.: US 11,428,860 B2
(45) Date of Patent: *Aug. 30, 2022

(54) STATIC MULTIVIEW DISPLAY AND METHOD EMPLOYING DIRECTIONAL LIGHT SOURCE AND HORIZONTAL DIFFUSER

(71) Applicant: LEIA INC., Menlo Park, CA (US)

(72) Inventor: David A. Fattal, Menlo Park, CA (US)

(73) Assignee: LEIA INC., Menlo Parl, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,206

(22) Filed: Jun. 1, 2021

(65) Prior Publication Data
US 2021/0294017 A1 Sep. 23, 2021

Related U.S. Application Data

(63) Continuation of application No. PCT/US2018/064633, filed on Dec. 8, 2018.

(51) Int. Cl.
*F21V 8/00* (2006.01)
*G02B 6/293* (2006.01)

(52) U.S. Cl.
CPC .......... *G02B 6/0051* (2013.01); *G02B 6/002* (2013.01); *G02B 6/0025* (2013.01);
(Continued)

(58) Field of Classification Search
CPC .................................................. G02B 6/0023
See application file for complete search history.

(56) References Cited

U.S. PATENT DOCUMENTS 9,128,226 B2 9/2015 Fattal et al.
9,201,270 B2 12/2015 Fattal et al.
(Continued)

FOREIGN PATENT DOCUMENTS

JP 2003162912 A 6/2003
JP 2009231017 A 10/2009
(Continued)

OTHER PUBLICATIONS

International Search Report and Written Opinion (ISRWO) by International Searching Authority (ISA) Korean Intellectual Property Office (KIPO) dated Sep. 6, 2019 (14 pages) for foreign counterpart parent International (PCT) Application No. PCT/US2018/064633.

(Continued)

*Primary Examiner* — Keith G. Delahoussaye
(74) *Attorney, Agent, or Firm* — J. Michael Johnson

(57) ABSTRACT

A static multiview display and method of static multiview display operation provide a static multiview image using diffractive gratings to diffractively scatter light from guided light beams having different radial directions provided by a horizontal diffuser. The static multiview display includes a light guide configured to guide the light beams; the horizontal diffuser configured to provide the guided light beams with the different radial directions using light from a directional light source; and a plurality of diffraction gratings configured to scatter out light from the guided light beam plurality as directional light beams representing the static multiview image. The method of static display operation includes providing and diffusing directional light to provide guided light beams having different radial directions, and further scattering out light from the guided light beam as directional light beams representing the static multiview image.

20 Claims, 9 Drawing Sheets

(52) U.S. Cl.
CPC ......... *G02B 6/0036* (2013.01); *G02B 6/0038* (2013.01); *G02B 6/0068* (2013.01); *G02B 6/29304* (2013.01)

(56) References Cited

U.S. PATENT DOCUMENTS

| | | | |
|---|---|---|---|
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,684,404 | B2 | 6/2020 | Fattal |
| 10,830,939 | B2 | 11/2020 | Fattal et al. |
| 10,890,706 | B2 | 1/2021 | Shinohara et al. |
| 10,908,454 | B2 * | 2/2021 | Liu ................... G03H 1/2286 |
| 2008/0285310 | A1 | 11/2008 | Aylward et al. |
| 2010/0182308 | A1 * | 7/2010 | Holman ............. G02B 6/0028 345/214 |
| 2011/0013145 | A1 | 1/2011 | Kato |
| 2014/0211125 | A1 | 7/2014 | Kurata |
| 2014/0362601 | A1 * | 12/2014 | Hsu ...................... G02B 6/002 362/609 |
| 2017/0059961 | A1 * | 3/2017 | Park .................... G02F 1/1334 |
| 2017/0242249 | A1 | 8/2017 | Wall et al. |
| 2019/0317265 | A1 | 10/2019 | Fattal et al. |
| 2019/0391315 | A1 | 12/2019 | Fattal |
| 2020/0012034 | A1 | 1/2020 | Fattal et al. |

FOREIGN PATENT DOCUMENTS

| | | |
|---|---|---|
| JP | 2010101912 A | 5/2010 |
| WO | 2011150863 A1 | 12/2011 |
| WO | 2018128657 A1 | 7/2018 |
| WO | 2018182743 A1 | 10/2018 |
| WO | 2018182917 A1 | 10/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

* cited by examiner

STATIC MULTIVIEW DISPLAY AND METHOD EMPLOYING DIRECTIONAL LIGHT SOURCE AND HORIZONTAL DIFFUSER

CROSS-REFERENCE TO RELATED APPLICATIONS

This application is a continuation application of and claims the benefit of priority to International Patent Application No. PCT/US2018/064633, filed Dec. 8, 2018, the entirety of which is incorporated by reference herein.

STATEMENT REGARDING FEDERALLY SPONSORED RESEARCH OR DEVELOPMENT

N/A

BACKGROUND

Displays and more particularly 'electronic' displays are a nearly ubiquitous medium for communicating information to users of a wide variety of devices and products. For example, electronic displays may be found in various devices and applications including, but not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices. Electronic displays generally employ a differential pattern of pixel intensity to represent or display an image or similar information that is being communicated. The differential pixel intensity pattern may be provided by reflecting light incident on the display as in the case of passive electronic displays. Alternatively, the electronic display may provide or emit light to provide the differential pixel intensity pattern. Electronic displays that emit light are often referred to as active displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
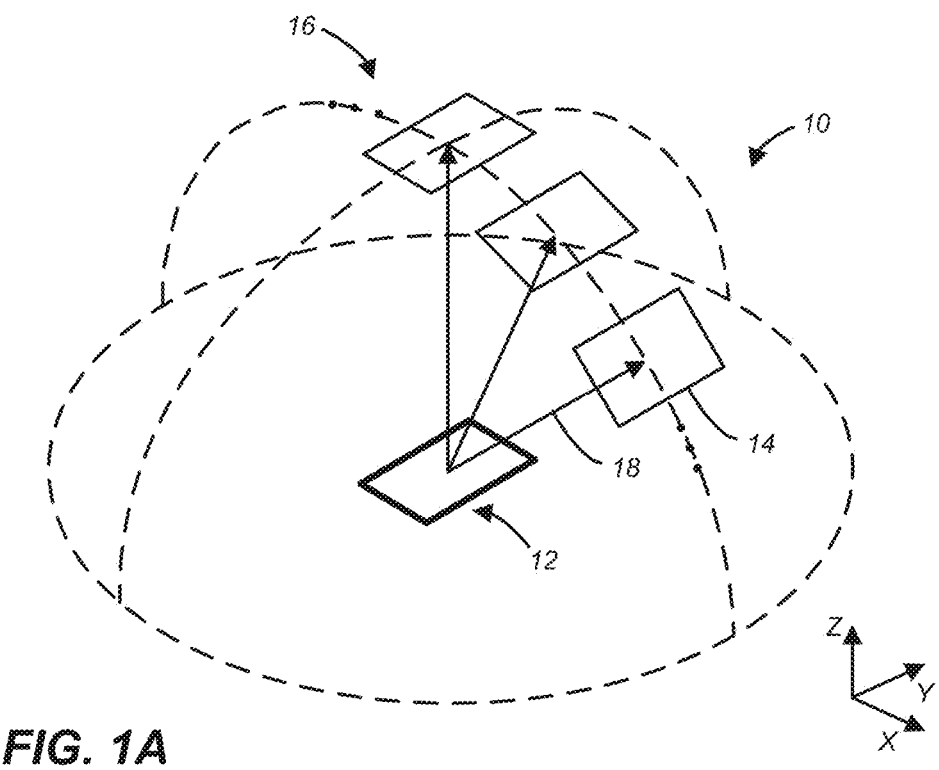
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide display of a static or quasi-static three-dimensional (3D) or multiview image. In particular, embodiments consistent with the principles described display the static or quasi-static multiview image using a plurality of directional light beams. The individual intensities and directions of directional light beams of the directional light beam plurality, in turn, correspond to various view pixels in views of the multiview image being displayed. According to various embodiments, the individual intensities and, in some embodiments, the individual directions of the directional light beams are predetermined or 'fixed.' As such, the displayed multiview image may be referred to as a static or quasi-static multiview image.

According to various embodiments, a static multiview display configured to display the static or quasi-static multiview image comprises a horizontal diffuser configured to provide, to a light guide, a plurality of guided light beams having different radial directions from directional light provided by a directional light source (such as, e.g., a laser). The direction light provided by the directional light source is collimated in at least a vertical direction and may be provided at a tilt angle relative to the vertical direction. Moreover, guided light beams of the guided light beam plurality are guided within the light guide at different radial directions from one another. Further, the static multiview display includes diffraction gratings optically connected to the light guide to provide the directional light beams having the individual directional light beam intensities and directions. The diffraction gratings are configured to emit or provide the directional light beams by or according to diffractive coupling or scattering out of light guided from within the light guide. As such, a diffraction grating of the diffraction grating plurality comprises a grating characteristic that accounts for or that is a function of a particular radial direction of a guided light beam incident on the diffraction grating. In particular, the grating characteristic may be a function of a relative location of the diffraction grating and the directional light source configured to provide the guided light beam. According to various embodiments, the grating characteristic is configured to account for the radial direction of the guided light beam to insure a correspondence between the emitted directional light beams provide by the diffraction gratings and associated view pixels in various views of the static or quasi-static multiview image being displayed.

Herein, a 'multiview display' is defined as an electronic display or display system configured to provide different views of a multiview image in different view directions. A 'static multiview display' is a defined as a multiview display configured to display a predetermined or fixed (i.e., static) multiview image, albeit as a plurality of different views. A 'quasi-static multiview display' is defined herein as a static multiview display that may be switched between different fixed multiview images or between a plurality of multiview image states, typically as a function of time. Switching between the different fixed multiview images or multiview image states may provide a rudimentary form of animation, for example. Further, as defined herein, a quasi-static multiview display is a type of static multiview display. As such, no distinction is made between a purely static multiview display or image and a quasi-static multiview display or image, unless such distinction is necessary for proper understanding.

FIG. 1A illustrates a perspective view of a multiview display 10 in an example, according to an embodiment consistent with the principles described herein. As illustrated in FIG. 1A, the multiview display 10 comprises a diffraction grating on a screen 12 configured to display a view pixel in a view 14 within or of a multiview image 16 (or equivalently a view 14 of the multiview display 10). The screen 12 may be a display screen of an automobile, a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image 16 in different view directions 18 (i.e., in different principal angular directions) relative to the screen 12. The view directions 18 are illustrated as arrows extending from the screen 12 in various different principal angular directions. The different views 14 are illustrated as polygonal boxes at the termination of the arrows (i.e., depicting the view directions 18). Thus, when the multiview display 10 (e.g., as illustrated in FIG. 1A) is rotated about the y-axis, a viewer sees different views 14. On the other hand (as illustrated) when the multiview display 10 in FIG. 1A is rotated about the x-axis the viewed image is unchanged until no light reaches the viewer's eyes (as illustrated).

Note that, while the different views 14 are illustrated as being above the screen 12, the views 14 actually appear on or in a vicinity of the screen 12 when the multiview image 16 is displayed on the multiview display 10 and viewed by the viewer. Depicting the views 14 of the multiview image 16 above the screen 12 as in FIG. 1A is done only for simplicity of illustration and is meant to represent viewing the multiview display 10 from a respective one of the view directions 18 corresponding to a particular view 14. Further, in FIG. 1A only three views 14 and three view directions 18 are illustrated, all by way of example and not limitation.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\phi$ is an angle in a horizontal plane (e.g., parallel to the multiview display screen plane).

Figure 1B:
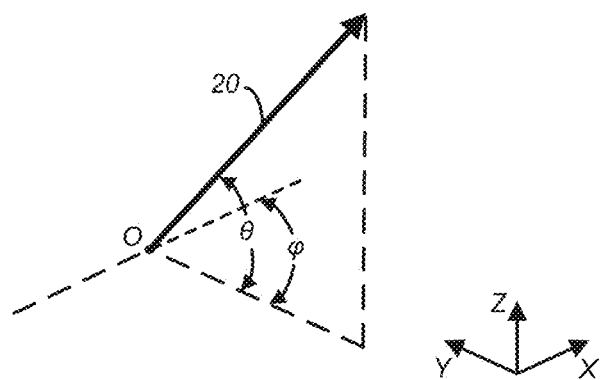
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 18 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

In the multiview display, a 'multiview pixel' is defined herein as a set or plurality of view pixels representing pixels in each of a similar plurality of different views of a multiview display. Equivalently, a multiview pixel may have an individual view pixel corresponding to or representing a pixel in each of the different views of the multiview image to be displayed by the multiview display. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

In some embodiments, a number of view pixels in a multiview pixel may be equal to a number of views of the multiview display. For example, the multiview pixel may provide eight (8) view pixels associated with a multiview display having 8 different views. Alternatively, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Further, according to some embodiments, a number of multiview pixels of the multiview display may be substantially equal to a number of pixels that make up a selected view of the multiview display.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' or 'diffractive scattering' in that the diffraction grating may couple or scatter light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively scatter out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below, a diffraction grating herein may have a grating characteristic, including one or more of a feature spacing or pitch, an orientation and a size (such as a width or length of the diffraction grating). Further, the grating characteristic may be selected or chosen to be a function of the angle of incidence of light beams on the diffraction grating, a distance of the diffraction grating from a directional light source or both. In particular, the grating characteristic of a diffraction grating may be chosen to depend on a relative location of the directional light source and a location of the diffraction grating, according to some embodiments. By appropriately varying the grating characteristic of the diffraction grating, both an intensity and a principal angular direction of a light beam diffracted (e.g., diffractively scattered-out of a light guide) by the diffraction grating (i.e., a 'directional light beam') corresponds to an intensity and a view direction of a view pixel of the multiview image.

According to various examples described herein, a diffraction grating (e.g., a diffraction grating of a multiview pixel, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
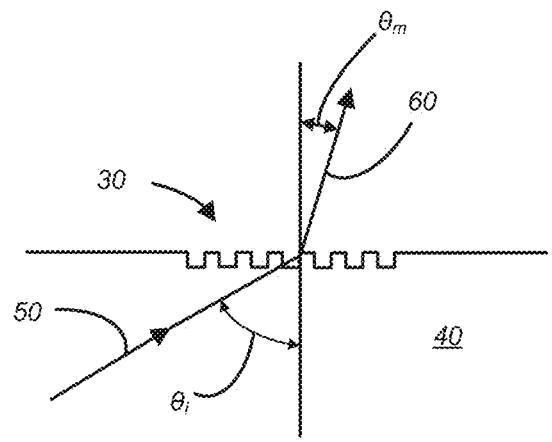
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam (or a collection of light beams) 50 incident on the diffraction grating 30 at an incident angle $\theta_i$. The light beam 50 is a guided light beam within the light guide 40. Also illustrated in FIG. 2 is a coupled-out or scattered-out light beam (or a collection of light beams) 60 diffractively produced and scattered-out by the diffraction grating 30 as a result of diffraction of the incident light beam 50. The scattered-out light beam 60 has a diffraction angle (or 'principal angular direction' herein) as given by equation (1). The scattered-out light beam 60 may correspond to a diffraction order 'm' of the diffraction grating 30, for example.

According to various embodiments, the principal angular direction of the various light beams is determined by the grating characteristic including, but not limited to, one or more of a size (e.g., a length, a width, an area, etc.) of the diffraction grating, an orientation, and a feature spacing. Further, a light beam produced by the diffraction grating has a principal angular direction given by angular components $\{\theta, \phi\}$, by definition herein, and as described above with respect to FIG. 1B.

Herein, a 'collimated light', 'collimated light beam' or 'light that is collimated' is generally defined as a beam of light in which rays of the light beam, at least in a plane, are substantially parallel to one another within the light beam (e.g., the guided light beam in the light guide). Further, rays of light that diverge or are scattered from the collimated light beam are not considered to be part of the collimated light beam, by definition herein.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters or a laser array. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a diffraction grating' means one or more diffraction gratings and as such, 'the diffraction grating' means 'the diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
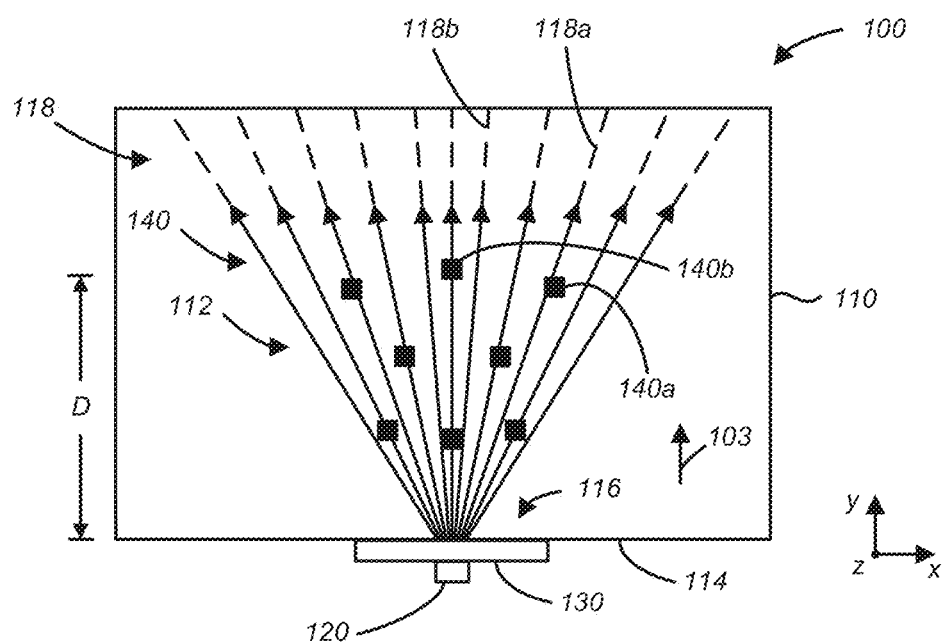
FIG. 3A illustrates a plan view of a static multiview display in an example, according to an embodiment consistent with the principles described herein.
Figure 3B:
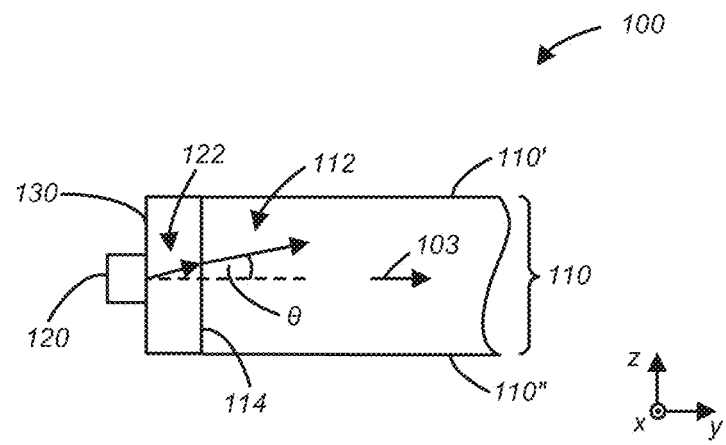
FIG. 3B illustrates a cross-sectional view of a portion of a static multiview display in an example, according to an embodiment consistent with the principles described herein.
Figure 3C:
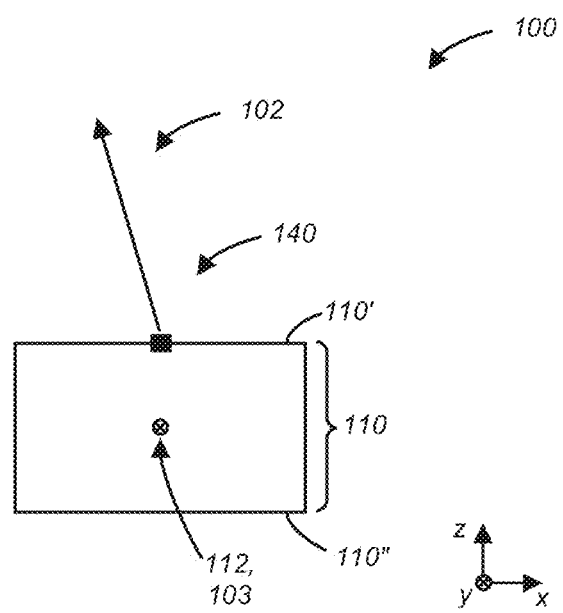
FIG. 3C illustrates a cross-sectional view of a portion of a static multiview display in an example, according to an embodiment consistent with the principles described herein.
Figure 3D:
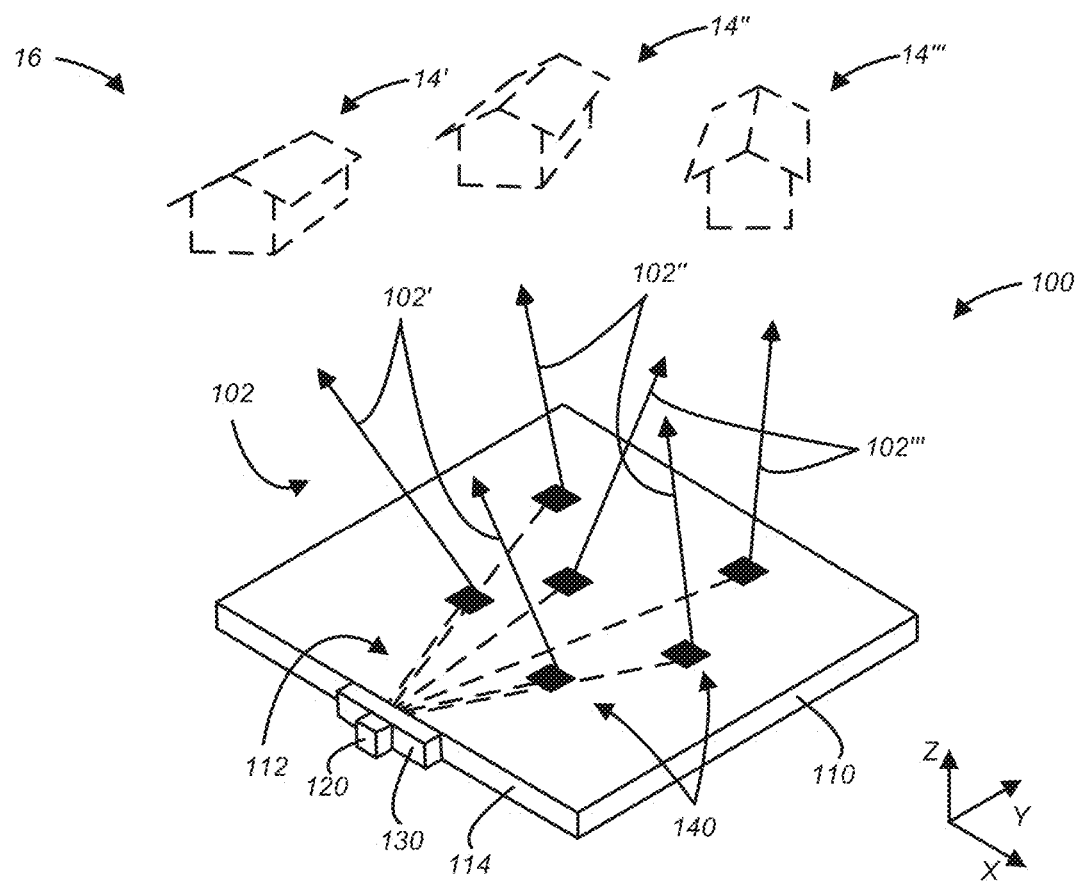
FIG. 3D illustrates a perspective view of a static multiview display in an example, according to an embodiment consistent with the principles described herein.

According to some embodiments of the principles described herein, a multiview display configured to provide multiview images and more particularly static multiview images (i.e., a static multiview display) is provided. FIG. 3A illustrates a plan view of a static multiview display 100 in an example, according to an embodiment consistent with the principles described herein. FIGS. 3B and 3C illustrate cross-sectional views of portions of a static multiview display 100 in an example, according to an embodiment consistent with the principles described herein. In particular, FIG. 3B may illustrate a cross section through a portion of the static multiview display 100 of FIG. 3A, the cross section being in an z-y plane, and FIG. 3C illustrates a cross section through a portion of the static multiview display 100 of FIG. 3A, the cross section being in an x-z plane. FIG. 3D illustrates a perspective view of a static multiview display 100 in an example, according to an embodiment consistent with the principles described herein.

According to some embodiments, the illustrated static multiview display 100 is configured to provide purely a static multiview image, while in others the static multiview display 100 may be configured to provide a plurality of multiview images and therefore functions as (or is) a quasi-static multiview display 100. For example, the static multiview display 100 may be switchable between different fixed multiview images or equivalently between a plurality of multiview image states, as described below.

The static multiview display 100 illustrated in FIGS. 3A-3D is configured to provide a plurality of directional light beams 102, each directional light beam 102 of the plurality having an intensity and a principal angular direction. Together, the plurality of directional light beams 102 represents various view pixels of a set of views of a multiview image that the static multiview display 100 is configured to provide or display. In some embodiments, the view pixels may be organized into multiview pixels to represent the various different views of the multiview images.

As illustrated, the static multiview display 100 comprises a light guide 110. The light guide may be a plate light guide (as illustrated), for example. The light guide 110 is configured to guide light along a length of the light guide 110 as guided light 112 or more particularly as guided light beams 112. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light beams 112 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide light as the guided light beams 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

According to various embodiments, the light guide 110 is configured to guide the guided light beams 112 according to total internal reflection at a non-zero propagation angle θ between a first surface 110' (e.g., a 'front' surface) and a second surface 110" (e.g., a 'back' or 'bottom' surface) of the light guide 110. In particular, the guided light beams 112 propagate by reflecting or 'bouncing' between the first surface 110' and the second surface 110" of the light guide 110 at the non-zero propagation angle θ.

As defined herein, a 'non-zero propagation angle' is an angle relative to a surface (e.g., the first surface 110' or the second surface 110") of the light guide 110. Further, the non-zero propagation angle θ is both greater than zero and less than a critical angle of total internal reflection within the light guide 110, according to various embodiments. For example, the non-zero propagation angle θ of the guided light beam 112 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle θ may be about thirty degrees (30°). In other examples, the non-zero propagation angle θ may be about 20°, or about 25°, or about 35°. Moreover, a specific non-zero propagation angle θ may be chosen (e.g., arbitrarily) for a particular implementation as long as the specific non-zero propagation angle θ is chosen to be less than the critical angle of total internal reflection within the light guide 110.

Further herein, the first and second surfaces 110', 110" of the light guide 110, between which the guided light beams 112 are guided, may be referred to as 'guiding surfaces' of the light guide 110, e.g., to distinguish the guiding surface(s) from other surfaces (i.e., non-guiding surfaces) such as edges of the light guide 110. As illustrated in FIGS. 3A-3C, the guiding surfaces are oriented in a horizontal direction or a horizontal plane (i.e., an x-y plane, as illustrated), by way of example and not limitation. As such, the guided light beams 112 have a general propagation direction 103 in the horizontal direction, depicted by a bold arrow.

As illustrated in FIGS. 3A, 3B and 3D, the static multiview display 100 further comprises a directional light source 120. The directional light source 120 is configured to provide directional light to the light guide 110. Further, the directional light source 120 is configured to provide the directional light that is collimated in a vertical direction, according to various embodiments. That is, the directional light provided by the directional light source 120 is collimated in a vertical direction orthogonal to both a propagation direction of the guided light beams 112 and to a guiding surface of the light guide 110. In FIGS. 3A-3C, the vertical direction is illustrated in a z-direction that is orthogonal to the horizontal direction in a z-direction.

According to various embodiments, the directional light source 120 may be located along an edge or side 114 of the light guide 110. Further, the directional light source 120 may be located along the side 114 at an input location 116, e.g., as illustrated. In some embodiments, the input location 116 of the directional light source 120 is near or about at a center or a middle of the side 114. In particular, in FIGS. 3A and 3D, the input location 116 of the directional light source 120 is approximately centered on (e.g., at a middle of) the side 114 (i.e., the 'input side') of the light guide 110. Alternatively (not illustrated), the input location 116 may be away from the middle of the side 114 of the light guide 110, e.g., at a corner. For example, the light guide 110 may have a rectangular shape (e.g., as illustrated) and the input location 116 of the directional light source 120 may be at a corner of the rectangular-shaped light guide 110 (e.g., a corner of the input side 114).

In various embodiments, the directional light source 120 may comprise substantially any source of light (e.g., optical emitter) that is configured to provide directional light including, but not limited to, a light emitting diode (LED) and a laser (e.g., a laser diode). In some embodiments, the directional light source 120 may comprise an optical emitter configured produce a substantially monochromatic light having a narrowband spectrum denoted by a particular color. In particular, the color of the monochromatic directional light may be a primary color of a particular color space or color model (e.g., an RGB color model). In other examples, the directional light source 120 may be a substantially broadband or polychromatic source of directional light configured to provide substantially broadband or polychromatic directional light. For example, the directional light source 120 may provide white light as the directional light. In some embodiments, the directional light source 120 may comprise a plurality of different optical emitters configured to provide different colors of light, such as an array of lasers or an array of LEDs having different colors. The different optical emitters may be configured to provide directional light having different, color-specific, non-zero propagation angles of the guided light corresponding to each of the different colors of light, according to some embodiments.

In various embodiments, the directional light provided by the directional light source 120 is at least collimated (i.e., the directional light may be collimated light beams) along or in the vertical direction, as mentioned above. In some embodiments, the directional light may be further collimated in the horizontal direction. For example, when the directional light source 120 comprises a laser, the directional light provided by the directional light source 120 may collimated in both the vertical direction and the horizontal direction. Moreover, the guided light beams 112 produced by coupling the directional light from the directional light source 120 into the light guide 110 may be at least partially collimated (i.e., the guided light beams 112 may be collimated light beams), e.g., along the vertical direction. That is, the guided light beams 112 may include collimated guided light beams 112 having a relatively narrow angular spread in a plane perpendicular to a guiding surface of the light guide 110 (e.g., the first or second surface 110', 110"), for example.

According to various embodiments, the static multiview display 100 illustrated in FIGS. 3A-3D further comprises a horizontal diffuser 130. The horizontal diffuser is configured to provide from the directional light the plurality of guided light beams 112 within the light guide 110. Further, guided light beams 112 of the guided light beam plurality have radial directions different from one another in the horizontal direction orthogonal to the vertical direction. That is, the horizontal diffuser 130 is configured to receive the directional light from the directional light source 120 and then to spread or diffuse the received directional light in the horizontal direction to provide the guided light beams 112 having differing radial directions, as illustrated in FIGS. 3A and 3D. As such, the horizontal diffuser 130 may scatter or diffuse the directional light along the horizontal direction to change a collimation factor of the directional light along the horizontal direction. Thus, the horizontal diffuser 130 located between the directional light source 120 and the light guide 110, is configured to provide directional light within the light guide 110 as the plurality of guided light beams 112 having the different radial directions. Further, the horizontal diffuser 130 is configured to substantially maintain or at least minimally affect the collimation factor of the directional light collimated in the vertical direction, according to various embodiments. In some embodiments, the horizontal diffuser 130 may be configured to further collimate the plurality of guided light beams along the vertical direction. Any of a variety of diffusers may be employed as the horizontal diffuser 130 including, but not limited to a holographic diffuser, a prism, or a lenticular sheet.

As illustrated in FIGS. 3A and 3D, the directional light emitted by the directional light source 120 enters the horizontal diffuser 130, which diffuses or scatters the directional light so that it spreads out along a horizontal direction (i.e., along the x-axis) that is orthogonal to the vertical direction (i.e., along the z-axis). The guided light beams 112 of the guided light beam plurality propagate in a radial pattern away from the input location 116 and across or along a length of the light guide 110 in the propagation direction 103. Individual guided light beams 112 of the guided light beam plurality have different radial directions 118 from one another by virtue of the radial pattern of propagation away from the input location 116. According to some embodiments, the directional light source 120 in combination with the horizontal diffuser 130 may approximate a 'point' source of light at the input location 116.

As illustrated in FIG. 3B, in some embodiments the directional light provided by the directional light source 120 has a tilt in the vertical direction. Alternatively or additionally, the horizontal diffuser 130 may tilt the directional light in the vertical direction. The tilt may result in the guided light beams 112 having the non-zero propagation angle θ in the vertical direction, according to various embodiments. Thus, the directional light source 120 and the horizontal diffuser 130 individually or in combination may be configured to provide the non-zero propagation angle θ of the guided light beams 112. Moreover, when optical emitters of different colors are employed, the directional light source 120 or the directional light source 120 in conjunction with the horizontal diffuser 130 may be configured to provide directional light having different, color-specific, non-zero propagation angles.

Note that use of at least partially collimated directional light beams in the vertical direction may impact a multiview image provided by the static multiview display 100, in some embodiments. For example, if the guided light beams 112 are tightly collimated in the vertical direction within the light guide 110, the emitted directional light beams 102 may have a relatively narrow or confined angular spread in at least one and possibly two orthogonal directions.

The static multiview display 100 further comprises a plurality of diffraction gratings 140 distributed across the light guide 110, as illustrated in FIGS. 3A, 3C and 3D. The plurality of diffraction gratings 140 is configured to scatter out light from the guided light beam plurality as directional light beams 102 of the directional light beam plurality. As mentioned above and according to various embodiments, the directional light beams 102 scattered out by the plurality of diffraction gratings 140 may represent a static multiview image, according to various embodiments. In particular, the directional light beams 102 emitted by the plurality of diffraction gratings 140 may be configured to create the static multiview image to display information, e.g., information having 3D content. Further, the diffraction gratings 140 may diffractively scatter out the directional light beams 102 when the light guide 110 is illuminated from the side 114 by the directional light source 120 and using the horizontal diffuser 130, as is further described below.

In particular, a diffraction grating 140 of the diffraction grating plurality is configured to provide from a portion of a guided light beam 112 of the guided light beam plurality a directional light beam 102 of the directional light beam plurality. Further, the diffraction grating 140 is configured to provide the directional light beam 102 having both an intensity and a principal angular direction corresponding to an intensity and a view direction of a view pixel of the multiview image. In various embodiments, the diffraction gratings 140 of the diffraction grating plurality generally do not intersect, overlap or otherwise touch one another, according to some embodiments. That is, each diffraction grating 140 of the diffraction grating plurality is generally distinct and separated from other ones of the diffraction gratings 140, according to various embodiments.

As illustrated in FIG. 3C, the directional light beams 102 may, at least in part, propagate in a direction that differs from and in some embodiments is orthogonal to an average or general propagation direction 103 of guided light beams 112 within the light guide 110. For example, as illustrated in FIG. 3C, the directional light beam 102 from a diffraction grating 140 may be substantially confined to the x-z plane, according to some embodiments. Note that changing the input position of the directional light source 120 (e.g., the input location 116) will generally change the principal angular direction of the directional light beam 102, however.

According to various embodiments, each of the diffraction gratings 140 of the diffraction grating plurality has an associated grating characteristic. The associated grating characteristic of each diffraction grating depends on, is defined by, or is a function of the radial direction 118 of the guided light beam 112 incident on the diffraction grating from the directional light source 120. In some embodiment, the associated grating characteristic is further determined or defined by a distance between the diffraction grating 140 and the input location 116 of the directional light source 120. For example, the associated characteristic may be a function of the distance D between diffraction grating 140 and the input location 116 as well as the radial direction 118 of the guided light beam 112 incident on the diffraction grating 140. Stated differently, an associated grating characteristic of a diffraction grating 140 in the plurality of the diffraction gratings 140 depends on the input location 116 of the directional light source and a particular location of the diffraction grating 140 on a surface of the light guide 110 relative to the input location 116.

FIG. 3A illustrates two different diffraction gratings 140a and 140b having different spatial coordinates ($x_1$, $y_1$) and ($x_2$, $y_2$), which further have different grating characteristics to compensate or account for the different radial directions 118a and 118b of the plurality of guided light beams 112 that are incident on the diffraction gratings 140. Similarly, the different grating characteristics of the two different diffraction gratings 140a and 140b account for different distances of the respective diffraction gratings 140a, 140b from the light source input location 116 determined by the different spatial coordinates ($x_1$, $y_1$) and ($x_2$, $y_2$).

FIG. 3D illustrates an example of a plurality of directional light beams 102 that may be provided by the static multiview display 100. In particular, as illustrated, different sets of diffraction gratings 140 of the diffraction grating plurality are illustrated emitting directional light beams 102 having different principal angular directions from one another. The different principal angular directions may correspond to different view directions of the static multiview display 100, according to various embodiments. For example, a first set of the diffraction gratings 140 may diffractively scatter out portions of incident guided light beams 112 (illustrated as dashed lines) to provide a first set of directional light beams 102' having a first principal angular direction corresponding to a first view direction (or a first view) of the static multiview display 100. Similarly, a second set of directional light beams 102" and a third set of directional light beams 102'" having principal angular directions corresponding to a second view direction (or a second view) and a third view direction (or third view), respectively of the static multiview display 100 may be provided by diffractive scattering out of other portions of incident guided light beams 112 by respective second third sets of diffraction gratings 140, and so on, as illustrated. Also illustrated in FIG. 3D are a first view 14', a second view 14", and a third view 14'", of a multiview image 16 that may be provided by the static multiview display 100. The illustrated first, second, and third views 14', 14", 14'", represent different perspective views of an object and collectively are the displayed multiview image 16 (e.g., equivalent to the multiview image 16 illustrated in FIG. 1A).

In general, the grating characteristic of a diffraction grating 140 may include one or more of a diffractive feature spacing or pitch, a grating orientation and a grating size (or extent) of the diffraction grating. Further, in some embodiments, a diffraction-grating coupling efficiency (such as the diffraction-grating area, the groove depth or ridge height, etc.) may be a function of the distance from the input location 116 to the diffraction grating. For example, the diffraction grating coupling efficiency may be configured to increase as a function of distance, in part, to correct or compensate for a general decrease in the intensity of the guided light beams 112 associated with the radial spreading and other loss factors. Thus, an intensity of the directional light beam 102 provided by the diffraction grating 140 and corresponding to an intensity of a corresponding view pixel may be determined, in part, by a diffractive coupling efficiency of the diffraction grating 140, according to some embodiments.

Figure 4:
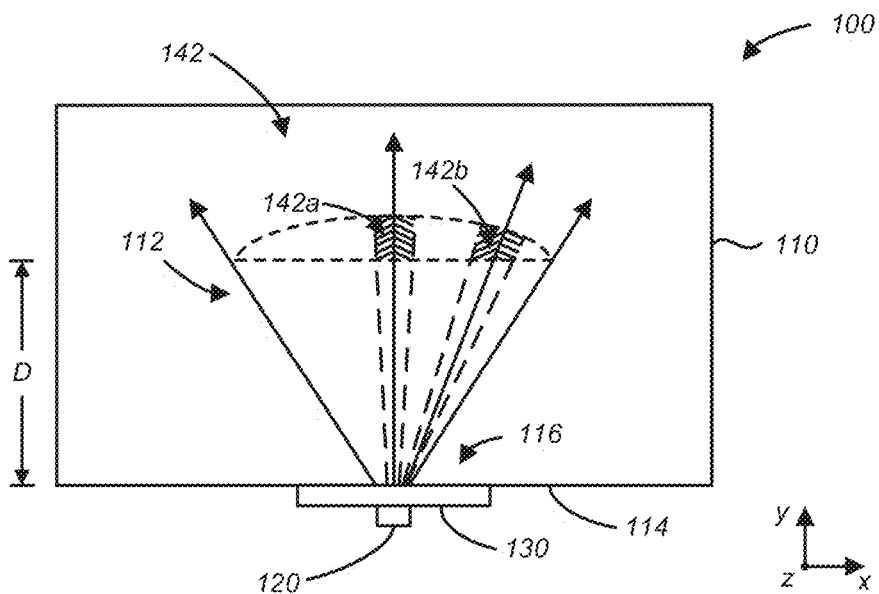
FIG. 4 illustrates a plan view of a static multiview display in an example, according to an embodiment consistent with the principles described herein.

FIG. 4 illustrates a plan view of a static multiview display 100 in an example, according to an embodiment consistent with the principles described herein. In FIG. 4, illumination volumes 142 in an angular space that is a distance D from input location 116 of the directional light source 120 at the side 114 of the light guide 110 are shown. Note that the illumination volume has a wider angular size as the radial direction of propagation of the plurality of guided light beams 112 changes in angle away from the y-axis and towards the x-axis. For example, illumination volume 142b is wider than illumination volume 142a, as illustrated.

Referring again to FIG. 3C, the plurality of diffraction gratings 140 may be located at or adjacent to the first surface 110' of the light guide 110, which is the light beam emission surface of the light guide 110, as illustrated. For example, the diffraction gratings 140 may be transmission mode diffraction gratings configured to diffractively scatter out the guided light portion through the first surface 110' as the directional light beams 102. Alternatively, the plurality of diffraction gratings 140 may be located at or adjacent to the second surface 110" opposite from a light beam emission surface of the light guide 110 (i.e., the first surface 110'). In particular, the diffraction gratings 140 may be reflection mode diffraction gratings. As reflection mode diffraction gratings, the diffraction gratings 140 are configured to both diffract the guided light portion and to reflect the diffracted guided light portion toward the first surface 110' to exit through the first surface 110' as the diffractively scattered-out directional light beams 102. In other embodiments (not illustrated), the diffraction gratings 140 may be located between the surfaces of the light guide 110, e.g., as one or both of a transmission mode diffraction grating and a reflection mode diffraction grating.

In some embodiments described herein, the principal angular directions of the directional light beams 102 may include an effect of refraction due to the directional light beams 102 exiting the light guide 110 at a light guide surface. For example, when the diffraction gratings 140 are located at or adjacent to second surface 110", the directional light beams 102 may be refracted (i.e., bent) because of a change in refractive index as the directional light beams 102 cross the first surface 110', by way of example and not limitation.

Figure 5A:
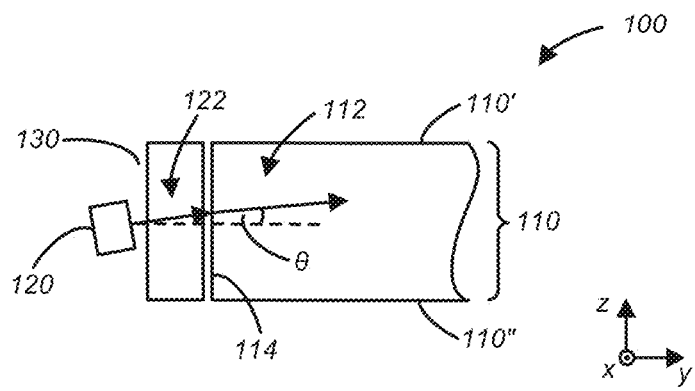
FIG. 5A is a cross-sectional view of a portion of a static multiview display in an example, according to an embodiment consistent with the principles described herein.
Figure 5B:
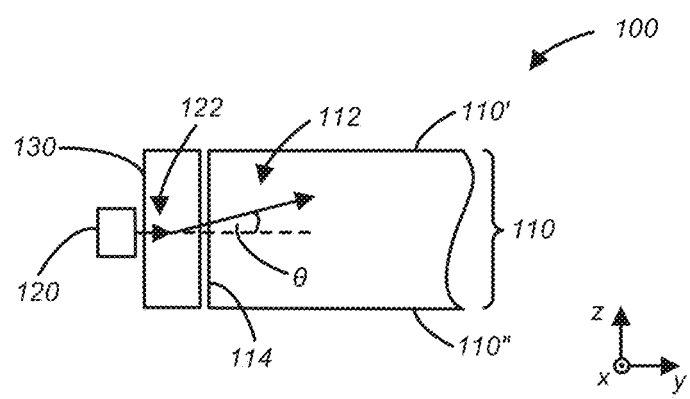
FIG. 5B is a cross-sectional view of a portion of a static multiview display in an example, according to an embodiment consistent with the principles described herein.
Figure 5C:
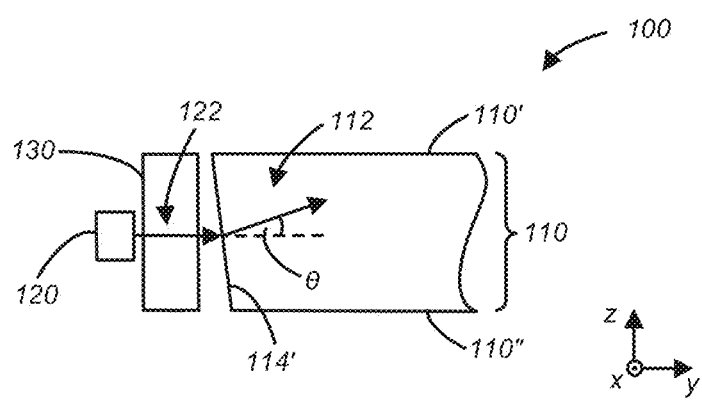
FIG. 5C is a cross-sectional view of a portion of a static multiview display in an example, according to an embodiment consistent with the principles described herein.

According to various embodiments, one or more of several different techniques may provide the non-zero propagation angle θ of the guided light beams 112 within the light guide 110. FIG. 5A illustrates a cross-sectional view of a portion of a static multiview display 100 in an example, according to an embodiment consistent with the principles described herein. FIG. 5B illustrates a cross-sectional view of a portion of a static multiview display 100 in an example, according to an embodiment consistent with the principles described herein. FIG. 5C illustrates a cross-sectional view of a portion of a static multiview display 100 in an example, according to an embodiment consistent with the principles described herein.

As illustrated by way of example and not limitation in FIG. 5A-5C, the non-zero propagation angle θ in various embodiments may be the result of one or more of a tilted directional light source 120, the horizontal diffuser 130 configured to tilt the directional light in the vertical direction, and a tilt provide by a shape/slope of an input surface or entrance facet at the side 114 of the light guide 110. That is, the directional light source 120 may be tilted such that the directional light emitted by the directional light source has a tilt in the vertical direction to provide the non-zero propagation angle θ of the guided light beams 112 within the light guide. FIG. 5A illustrates a tilted directional light source 120, by way of example and not limitation. In other embodiments, the tilted directional light from the directional light source 120 may be provided by another mechanism including, but not limited to, a tilted reflector or tilted lens within the directional light source 120, for example. FIG. 5B illustrates the horizontal diffuser 130 configured to tilt the directional light to provide guided light beams 112 of the guided light beam plurality having the non-zero propagation angle θ in the vertical direction within the light guide 110. While FIG. 5B illustrates the tilt occurring at a middle of the horizontal diffuser 130 for purposes of illustration, the tilting of the direction light may occur continuously over a thickness of the horizontal diffuser 130, for example. FIG. 5C illustrates the light guide 110 comprising an input surface 114' with a shape configured to provide guided light beams 112 of the guided light beam plurality having the non-zero propagation angle θ in the vertical direction within the light guide 110. In particular, FIG. 5C illustrates the input surface 114' as a substantially flat slanted surface or facet. In other embodiments (not illustrated), the input surface 114' may have a tilted or slanted surface that is curved or shaped (e.g., a tilted parabolic surface). While not illustrated in FIGS. 5A-5C, in some embodiments another refractive, reflecting or diffracting structure (such as a lens or diffraction grating) may be used to provide the tilt of the directional light that results in the non-zero propagation angle θ of the guided light beams 112 in the vertical direction.

In some embodiments, the direction light beams may be tilted in more than one direction relative to the vertical direction, and thus, the plurality of guided beams may have more than one non-zero propagation angle θ. For example, a bilateral configuration of any of the above-described configuration may be used. The bilateral configuration may be used to provide the tilt in two equal but opposite directions in the vertical direction. As such, guided light beams 112 having non-zero propagation angles θ of equal magnitude, but opposite sign may be provided within the light guide 110.

In some embodiments, provision may be made to mitigate, and in some instances even substantially eliminate, various sources of spurious reflection of guided light 112 within the static multiview display 100, especially when those spurious reflection sources may result in emission of unintended direction light beams and, in turn, the production of unintended images by static multiview display 100. Examples of various potential spurious reflection sources include, but not limited to, sidewalls of the light guide 110 that may produce a secondary reflection of the guided light 112. Reflection from various spurious reflection sources within the static multiview display 100 may be mitigated by any of a number of methods including, but not limited to absorption and controlled redirection of the spurious reflection.

Figure 6A:
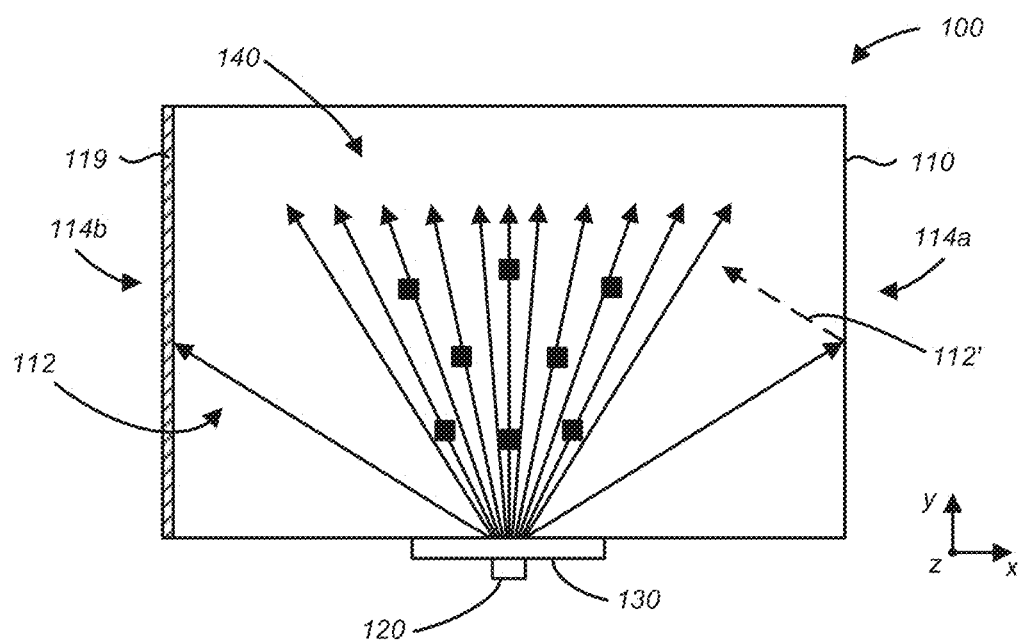
FIG. 6A illustrates a plan view of a static multiview display including spurious reflection mitigation in an example, according to an embodiment consistent with the principles described herein.
Figure 6B:
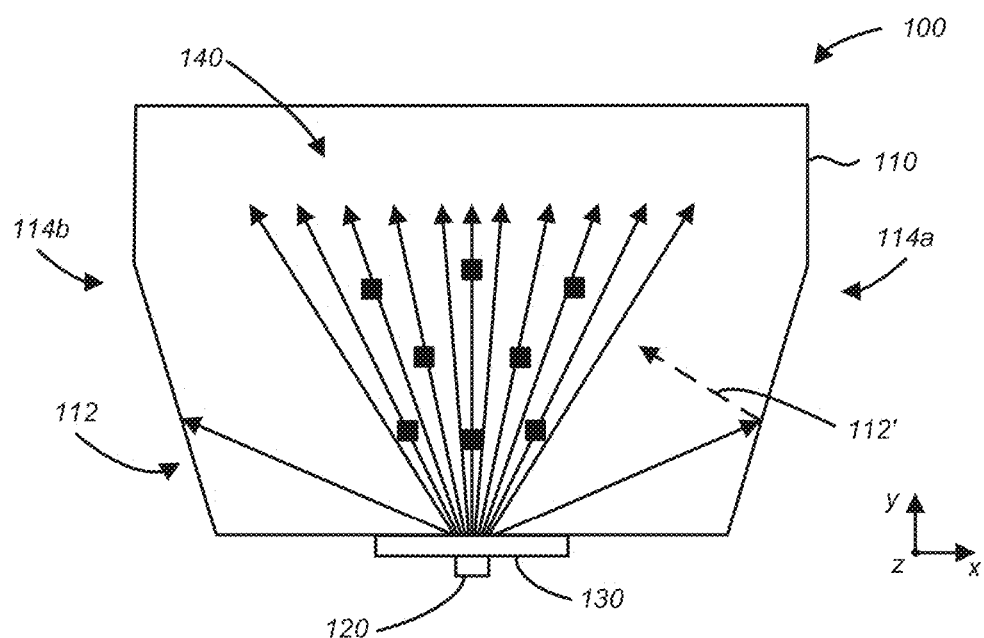
FIG. 6B illustrates a plan view of a static multiview display including spurious reflection mitigation in an example, according to another embodiment consistent with the principles described herein.

FIG. 6A illustrates a plan view of a static multiview display 100 including spurious reflection mitigation in an example, according to an embodiment consistent with the principles described herein. FIG. 6B illustrates a plan view of a static multiview display 100 including spurious reflection mitigation in an example, according to another embodiment consistent with the principles described herein. In particular, FIGS. 6A and 6B illustrate the static multiview display 100 comprising the light guide 110, the directional light source 120, and the plurality of diffraction gratings 140. Also illustrated is the plurality of guided light beams 112 with at least one guided light beam 112 of the plurality being incident on a sidewall 114a, 114b of the light guide 110. A potential spurious reflection of the guided light beam 112 by the sidewalls 114a, 114b is illustrated by a dashed arrow representing a reflected guided light beam 112'.

In FIG. 6A, the static multiview display 100 further comprises an absorbing layer 119 at the sidewalls 114a, 114b of the light guide 110. The absorbing layer 119 is configured to absorb incident light from the guided light beams 112. The absorbing layer may comprise substantially any optical absorber including, but not limited to, black paint applied to the sidewalls 114a, 114b for example. As illustrated in FIG. 6A, the absorbing layer 119 is applied to sidewall 114b, while the sidewall 114a lacks the absorbing layer 119, by way of example and not limitation. The absorbing layer 119 intercepts and absorbs the incident guided light beam 112 effectively preventing or mitigating the production of the potential spurious reflection from sidewall 114b. On the other hand, guided light beam 112 incident on the sidewall 114a reflects resulting in the production of the reflected guided light beam 112', illustrated by way of example and not limitation.

FIG. 6B illustrates spurious reflection mitigation using controlled reflection angle. In particular, the light guide 110 of the static multiview display 100 illustrated in FIG. 6B comprises slanted sidewalls 114a, 114b. The slanted sidewalls have a slant angle configured to preferentially direct the reflected guided light beam 112' substantially away from the diffraction gratings 140. As such, the reflected guided light beam 112' is not diffractively scattered out of the light guide 110 as an unintended directional light beam. The slant angle of the sidewalls 114a, 114b may be in the x-y plane, as illustrated. In other examples (not illustrated), the slant angle of the sidewalls 114a, 114b may be in another plane, e.g., the x-z plane to direct the reflected guided light beam 112' out a top or bottom surface of the light guide 110. Note that FIG. 6B illustrates sidewalls 114a, 114b that include a slant along only a portion of thereof, by way of example and not limitation.

According to some embodiments (not illustrated), the static multiview display 100 may comprise a plurality of directional light sources 120 that are laterally offset from one another. The lateral offset of directional light sources 120 of the directional light source plurality may provide a difference in the radial directions of various guided light beams 112 at or between individual diffraction gratings 140. The difference, in turn, may facilitate providing animation of a displayed multiview image, according to some embodiments. Thus, the static multiview display 100 may be a quasi-static multiview display 100, in some embodiments.

For example, by switching between different laterally offset directional light sources 120, the static multiview display 100 may provide 'animation' of the multiview images, such as a time-sequenced animation. That is, by sequentially illuminating the directional light sources during different sequential time intervals or periods, static multiview display 100 may be configured to shift an apparent location of the multiview image during the different time periods. This shift in apparent location provided by the animation may represent and example of operating the static multiview display 100 as a quasi-static multiview display 100 to provide a plurality of multiview image states, according to some embodiments.

According to various embodiments, as described above with respect to FIGS. 3A-3D, the directional light beams 102 of the static multiview display 100 are emitted using diffraction (e.g., by diffractive scattering or diffractive coupling). In some embodiments, the plurality of the diffraction gratings 140 may be organized as multiview pixels, each multiview pixel including a set of diffraction gratings 140 comprising one or more diffraction gratings 140 from the diffraction grating plurality. Further, as has been discussed above, the diffraction grating(s) 140 have diffraction characteristics that are a function of radial location on the light guide 110 as well as being a function of an intensity and direction of the directional light beams 102 emitted by the diffraction grating(s) 140.

Figure 7A:
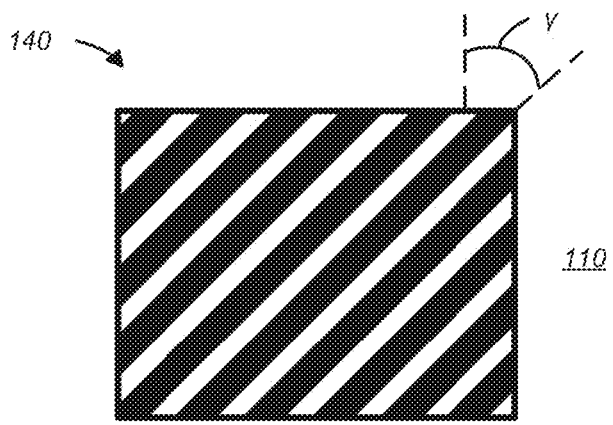
FIG. 7A illustrates a plan view of a diffraction grating of a multiview display in an example, according to an embodiment consistent with the principles described herein.
Figure 7B:
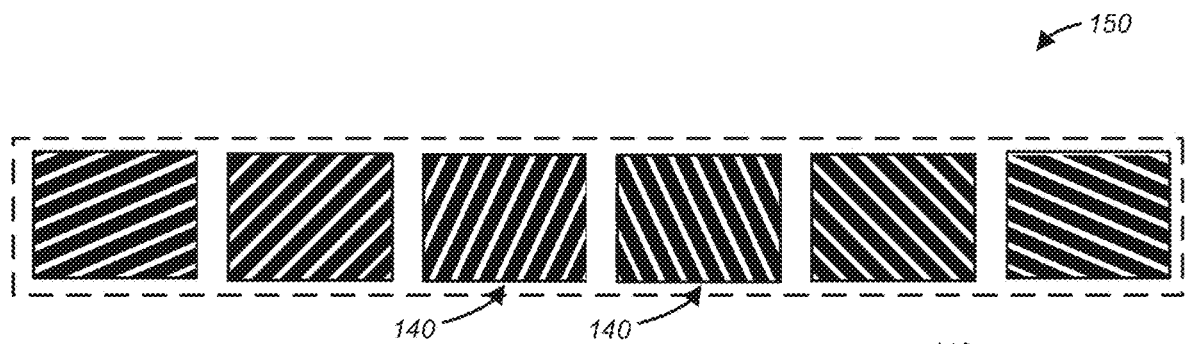
FIG. 7B illustrates a plan view of a set diffraction gratings organized as a multiview pixel in an example, according to another embodiment consistent with the principles described herein.

FIG. 7A illustrates a plan view of a diffraction grating 140 of a multiview display in an example, according to an embodiment consistent with the principles described herein. FIG. 7B illustrates a plan view of a set of diffraction gratings 140 organized as a multiview pixel 150 in an example, according to another embodiment consistent with the principles described herein. As illustrated in FIGS. 7A and 7B, each of the diffraction gratings 140 comprises a plurality of diffractive features spaced apart from one another according to a diffractive feature spacing (which is sometimes referred to as a 'grating spacing') or grating pitch. The diffractive feature spacing or grating pitch is configured to provide diffractive coupling out or scattering of the guided light portion from within the light guide. In FIGS. 7A-7B, the diffraction gratings 140 are on a surface of a light guide 110 of the multiview display (e.g., the static multiview display 100 illustrated in FIGS. 3A-3D).

According to various embodiments, the spacing or grating pitch of the diffractive features in the diffraction grating 140 may be sub-wavelength (i.e., less than a wavelength of the guided light beams 112). Note that FIGS. 7A and 7B illustrate the diffraction gratings 140 having a single or uniform grating spacing (i.e., a constant grating pitch) for simplicity of illustration. In various embodiments, as described below, the diffraction grating 140 may include a plurality of different grating spacings (e.g., two or more grating spacings) or a variable diffractive feature spacing or grating pitch to provide the directional light beams 102. Consequently, FIGS. 7A and 7B are not intended to imply that a single grating pitch is an exclusive embodiment of diffraction grating 140.

According to some embodiments, the diffractive features of the diffraction grating 140 may comprise one or both of grooves and ridges that are spaced apart from one another. The grooves or the ridges may comprise a material of the light guide 110, e.g., the groove or ridges may be formed in a surface of the light guide 110. In another example, the grooves or the ridges may be formed from a material other than the light guide material, e.g., a film or a layer of another material on a surface of the light guide 110.

As discussed previously and shown in FIG. 7A, the configuration of the diffraction features comprises a grating characteristic of the diffraction grating 140. For example, a grating depth of the diffraction grating may be configured to determine the intensity of the directional light beams 102 provided by the diffraction grating 140. Alternatively or additionally, discussed previously and shown in FIGS. 7A and 7B, the grating characteristic comprises one or both of a grating pitch of the diffraction grating 140 and a grating orientation (e.g., the grating orientation y illustrated in FIG. 7A). In conjunction with the angle of incidence of the guided light beams, these grating characteristics determine the principal angular direction of the directional light beams 102 provided by the diffraction grating 140.

In some embodiments (not illustrated), the diffraction grating 140 configured to provide the directional light beams comprises a variable or chirped diffraction grating as a grating characteristic. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multiview pixel may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In other embodiments, diffraction grating 140 configured to provide the directional light beams 102 is or comprises a plurality of diffraction gratings (e.g., sub-gratings). For example, the plurality of diffraction gratings of the diffraction grating 140 may comprise a first diffraction grating configured to provide a red portion of the directional light beams 102. Further, the plurality of diffraction gratings of the diffraction grating 140 may comprise a second diffraction grating configured to provide a green portion of the directional light beams 102. Further still, the plurality of diffraction gratings of the diffraction grating 140 may comprise a third diffraction grating configured to provide a blue portion of the directional light beams 102. In some embodiments, individual diffraction gratings of the plurality of diffraction gratings may be superimposed on one another. In other embodiments, the diffraction gratings may be separate diffraction gratings arranged next to one another, e.g., as an array.

More generally, the static multiview display 100 may comprise one or more instances of multiview pixels 150, which each comprise sets of diffraction gratings 140 from the plurality of diffraction gratings 140. As shown in FIG. 7B, the diffraction gratings 140 of the set that makes up a multiview pixel 150 may have different grating characteristics. The diffraction gratings 140 of the multiview pixel may have different grating orientations, for example. In particular, the diffraction gratings 140 of the multiview pixel 150 may have different grating characteristics determined or dictated by a corresponding set of views of a multiview image. For example, the multiview pixel 150 may include a set of six (6) diffraction gratings 140 as illustrated in FIG. 7B that, in turn, correspond to 6 different views of the static multiview display 100. Moreover, the static multiview display 100 may include multiple multiview pixels 150. For example, there may be a plurality of multiview pixels 150 with sets of diffraction gratings 140, each multiview pixels 150 corresponding to a different one of 2048×1024 pixels in each of the 6 different views. In other embodiments (not illustrated), the multiview pixel may include two (2), four (4), eight (8) or more diffraction gratings 140 corresponding to 2, 4, 8, or more different views of the static multiview display 100, for example.

In some embodiments, static multiview display 100 may be transparent or substantially transparent. In particular, the light guide 110 and the spaced apart plurality of diffraction gratings 140 may allow light to pass through the light guide 110 in a direction that is orthogonal to both the first surface 110' and the second surface 110", in some embodiments. Thus, the light guide 110 and more generally the static multiview display 100 may be transparent to light propagating in the direction orthogonal to the general propagation direction 103 of the guided light beams 112 of the guided light beam plurality. Further, the transparency may be facilitated, at least in part, by the substantially transparency of the diffraction gratings 140.

In accordance with some embodiments of the principles described herein, a static multiview display is provided. The static multiview display is configured to emit a plurality of directional light beams provided by the static multiview display. Further, the emitted directional light beams may be preferentially directed toward a plurality of views zones of the static multiview display based on the grating characteristics of a plurality of diffraction grating that are included in one or more multiview pixels in the static multiview display. Moreover, the diffraction gratings may produce different principal angular directions in the directional light beams, which corresponding to different viewing directions for different views in a set of views of the multiview image of the static multiview display. In some examples, the static multiview display is configured to provide or 'display' a 3D or multiview image. Different ones of the directional light beams may correspond to individual view pixels of different 'views' associated with the multiview image, according to various examples. The different views may provide a 'glasses free' (e.g., autostereoscopic) representation of information in the multiview image being displayed by the static multiview display, for example.

Figure 8:
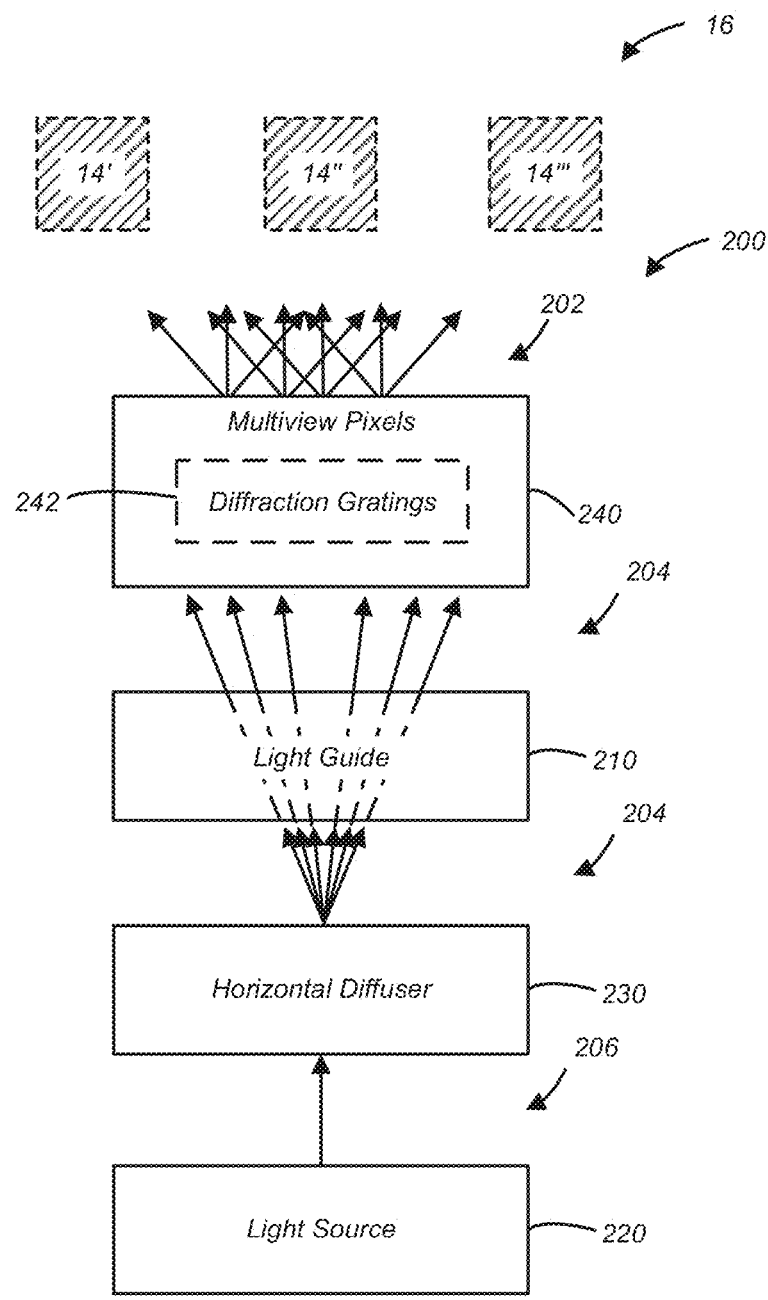
FIG. 8 illustrates a block diagram of a static multiview display in an example, according to an embodiment consistent with the principles described herein.

FIG. 8 illustrates a block diagram of a static multiview display 200 in an example, according to an embodiment consistent with the principles described herein. According to various embodiments, the static multiview display 200 is configured to display a multiview image according to different views in different view directions. In particular, a plurality of directional light beams 202 emitted by the static multiview display 200 are used to display the multiview image and may correspond to pixels of the different views (i.e., view pixels). The directional light beams 202 are illustrated as arrows emanating from one or more multiview pixels 240 in FIG. 8. Also illustrated in FIG. 8 are a first view 14', a second view 14", and a third view 14''', of a multiview image 16 that may be provided by the static multiview display 200.

Note that the directional light beams 202 associated with one of multiview pixels 240 are either static or quasi-static (i.e., not actively modulated). Instead, the multiview pixels 240 either provide the directional light beams 202 when they are illuminated or do not provide the directional light beams 202 when they are not illuminated. Further, an intensity of the provided directional light beams 202 along with a direction of those directional light beams 202 defines the pixels of the multiview image 16 being displayed by the static multiview display 200, according to various embodiments. Further, the displayed views 14', 14", 14''' within the multiview image 16 are static or quasi-static, according to various embodiments.

As illustrated in FIG. 8, the static multiview display 200 comprises a plate light guide 210. The plate light guide 210 is configured to guide light as guided light beams 204. In some embodiments, the plate light guide 210 may be substantially similar to the light guide 110 described above with respect to the static multiview display 100. For example, the plate light guide 210 may comprise a plate of optically transparent material configured to guide the guided light beams 204 according to total internal reflection. Further, the plate light guide 210 has a pair of opposing, spaced apart guiding surfaces that are oriented in a horizontal direction or horizontal plane.

The static multiview display 200 illustrated in FIG. 8 further comprises a directional light source 220. The directional light source 220 is configured to provide directional light 206 that is collimated in a vertical direction orthogonal to a guiding surface of the plate light guide 210. According to some embodiments, the directional light source 220 may be substantially similar to one of the directional light source 120 of the static multiview display 100, described above. For example, the directional light source 220 may comprise a laser. When the directional light source 220 comprises a laser, the directional light 206 may be collimated in both the vertical direction and horizontal direction at an output of the laser, for example. In other embodiments, the directional light source 220 may comprise another optical emitter such as, but not limited to, a light emitting diode (LED) along with a collimator configured to collimate light in the vertical direction to provide the directional light 206.

As illustrated, the static multiview display 200 further comprises a horizontal diffuser 230. The horizontal diffuser 230 is configured to provide a plurality of guided light beams 204 from the directional light 206. According to various embodiments, guided light beams 204 of the guided light beam plurality have both a non-zero propagation angle in the vertical direction and different radial directions from one another in a horizontal direction orthogonal to the vertical direction.

In some embodiments, the horizontal diffuser 230 may be substantially similar to horizontal diffuser 130 of the static multiview display 100, described above. In particular, the horizontal diffuser 230 may be configured to scatter or diffuse the direction light 206 received from the directional light source 220 in a substantially horizontal direction to provide the guided light beams 204 having radial directions different from one another in the horizontal direction. In particular, the guided light beams 204 in the plate light guide 210 that are provide by the horizontal diffuser 230 may radiate as they propagate in a fan-shape or radial pattern to provide the plurality of guided light beams 204 having the different radial directions. The horizontal diffuser 230 may be optically coupled or connected to the plate light guide 210 at an input edge. In FIG. 8, the directional light 206 (e.g., illustrated by an arrow emanating from the directional light source 220) is spread out along the horizontal direction by the horizontal diffuser 230 and then guided by the plate light guide 210 as the plurality of guided light beams 204.

The static multiview display 200 illustrated in FIG. 8 further comprises an array of the multiview pixels 240. The multiview pixels 240 of the array are configured to provide the multiview image or more particularly to provide a plurality of different views of the static multiview display 200. According to various embodiments, a multiview pixel 240 of the array comprises a plurality of diffraction gratings 242 configured to diffractively scatter out light from the guided light beam plurality as the directional light beams 202 of the directional light beam plurality. The plurality of directional light beams 202 may have principal angular directions, which correspond to different views directions of different views in a set of views of the static multiview display 200. Moreover, a principal angular direction of a directional light beam 202 provided by a diffraction grating 242 of the diffraction grating plurality is a function of a grating characteristic, the grating characteristic being a function of a relative location of the diffraction grating and the directional light source, according to various embodiments. That is, grating characteristics of the diffraction gratings 242 may be varied or selected based on the radial direction of guided light beams 204 incident on the diffraction gratings 242 or equivalently a location of the diffraction gratings 242 on the plate light guide 210 along with a distance to the directional light source 220 and horizontal diffuser 230 that provide the guided light beams 204.

In some embodiments, the diffraction gratings 242 and multiview pixels 240 may be substantially similar to diffraction gratings 140 and multiview pixel 150, respectively, of the static multiview display 100, described above. In particular, the multiview pixels 240 are optically connected to the plate light guide 210 to scatter or couple out the portion of the guided light beams 204 by diffractive scattering or diffractive coupling.

In some embodiments, grating characteristics of the diffraction gratings 242 are varied across the plate light guide surface. In particular, the grating characteristic may comprise one or both of a grating pitch and a grating orientation of the diffraction grating. An intensity of the directional light beam 202 provided by the diffraction grating 242 and corresponding to an intensity of a corresponding view pixel may be determined by a diffractive coupling efficiency of the diffraction grating 242. In this way, the directional light beams 202 from different diffraction gratings 242 in a multiview pixel 240 may correspond to pixels of views of a multiview image provided by the static multiview display 200.

In various embodiments, the guided light beams 204 are provided with the non-zero propagation angle within the plate light guide 210 by one or more of the directional light source 220, the horizontal diffuser 230, and an input surface of the plate light guide 210. In particular, in some embodiments, the directional light source 220 has a tilt angle in the vertical direction. The tilt angle may be configured to provide the directional light 205 having the non-zero propagation angle in the vertical direction, for example. In other embodiments, the horizontal diffuser 230 is configured to tilt the directional light 206 to provide the guided light beams 204 of the guided light beam plurality with the non-zero propagation angle in the vertical direction within the plate light guide 210. In yet other embodiments, the plate light guide 210 comprises an input surface at an input end having a shape configured to provide the guided light beams 204 of the guided light beam plurality having the non-zero propagation angle in the vertical direction within the plate light guide 210.

Figure 9:
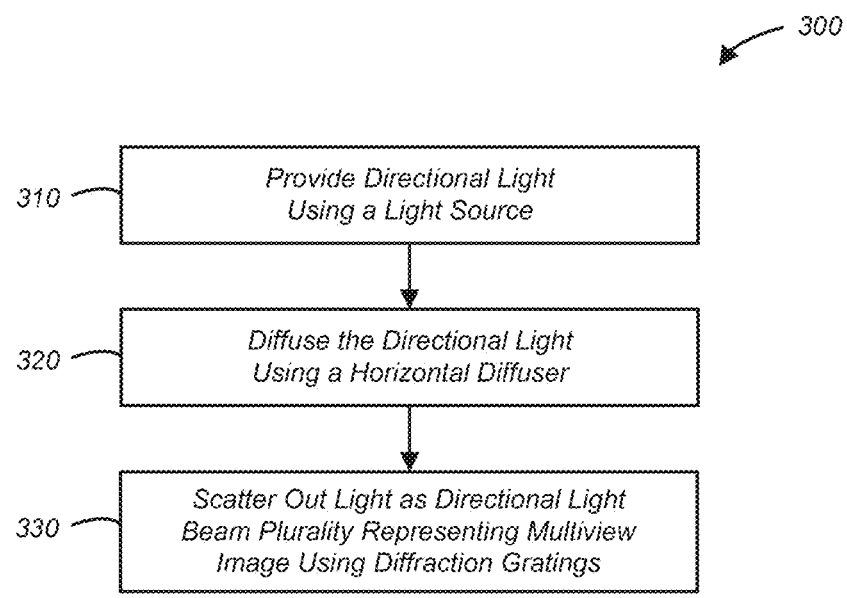
FIG. 9 illustrates a flow chart of a method of static multiview display operation in an example, according to an embodiment consistent with the principles described herein.

In accordance with other embodiments of the principles described herein, a method of static multiview display operation is provided. FIG. 9 illustrates a flow chart of a method 300 of static multiview display operation in an example, according to an embodiment consistent with the principles described herein. The method 300 of static multiview display operation may be used to provide one or both display of a static multiview image and display of a quasi-static multiview image, according to various embodiments.

As illustrated in FIG. 9, the method 300 of static multiview display operation comprises providing 310 directional light to be guided as the plurality of guided light beams using a directional light source. In particular, the directional light is provided is collimated in a vertical direction, according to various embodiments. In some embodiments, the directional light source may be substantially similar to the directional light source 120 of the static multiview display 100, described above. For example, the directional light source may comprise a laser. Further, the directional light source may approximate a point source representing the common point of origin, in some embodiments.

The method 300 of static multiview display operation illustrated in FIG. 9 further comprises diffusing 320 the directional light using a horizontal diffuser to provide a plurality of guided light beams within the light guide. Guided light beams of the guided light beam plurality, provided by diffusing 320 the directional light, have radial directions different from one another in a horizontal direction of the light guide that is orthogonal to the vertical direction. In some embodiments, the horizontal diffuser may be substantially similar to the horizontal diffuser 130 of the static multiview display 100, described above.

According to various embodiments, the method 300 of static multiview display operation further comprises scattering out 330 light from the guided light beam plurality as directional light beams using a plurality of diffraction gratings distributed across the light guide, the directional light beams representing view pixels a static multiview image. According to various embodiments, a diffraction grating of the diffraction grating plurality diffractively couples or scatters out light from the guided light beam plurality as a directional light beam of the directional light beam plurality. Further, the directional light beam that is coupled or scattered out has both an intensity and a principal angular direction of a corresponding view pixel of the multiview image. In particular, the plurality of directional light beams produced by the scattering 330 may have principal angular directions corresponding to different view pixels in a set of views of the multiview image. Moreover, intensities of directional light beams of the directional light beam plurality may correspond to intensities of various view pixels of the multiview image.

In some embodiments, each of the diffraction gratings produces a single directional light beam in a single principal angular direction and having a single intensity corresponding to a particular view pixel in one view of the multiview image. In some embodiments, the diffraction grating comprises a plurality of diffraction grating (e.g., sub-gratings). Further, a set of diffraction gratings may be arranged as a multiview pixel of the static multiview display, in some embodiments.

In various embodiments, the intensity and principal angular direction of the scattered 330 directional light beams are controlled by a grating characteristic of the diffraction grating that is based on (i.e., is a function of) a location of the diffraction grating relative to the common origin point. In particular, grating characteristics of the plurality of diffraction gratings may be varied based on, or equivalently may be a function of, radial directions of incident guided light beams at the diffraction gratings, a distance from the diffraction gratings to a directional light source that provides the guided light beams, or both.

According to some embodiments, the plurality of diffraction gratings may be substantially similar to the plurality of diffraction gratings 140 of the static multiview display 100, described above. Further, in some embodiments, the scattered 330 plurality of directional light beams may be substantially similar to the plurality of directional light beams 102, also described above. For example, the grating characteristic controlling the principal angular direction may comprise one or both of a grating pitch and a grating orientation of the diffraction grating. Further, an intensity of the directional light beam provided by the diffraction grating and corresponding to an intensity of a corresponding view pixel may be determined by a diffractive coupling efficiency of the diffraction grating. That is, the grating characteristic controlling the intensity may comprise a grating depth of the diffraction grating, a size of the gratings, etc., in some examples.

According to some embodiments (not illustrated), the method 300 of static multiview display operation further comprises providing the plurality of guided light beams at a non-zero propagation angle within the light guide, the non-zero propagation angle being an angle in the vertical direction. According to some embodiments, the light guide along which the light is guided as well as the guided light beams that are guided therein may be substantially similar to the light guide 110 and guided light beams 112, respectively, as described above with reference to the static multiview display 100.

In some embodiments, the non-zero propagation angle is provided one or more of by tilting the directional light source in the vertical direction, tilting the directional light using the horizontal diffuser, and tilting the guided light beams of the guided light beam plurality at an input of the light guide using a shape of an input surface of the light guide.

In some embodiments (not illustrated), the method of static multiview display operation further comprises animating the multiview image by guiding a first plurality of light guided light beams during a first time period and guiding a second plurality of guided light beams during a second time period during a second period. The first guided light beam plurality may have a common origin point that differs from a common origin point of the second guided light beam plurality. For example, the directional light source may comprise a plurality of laterally offset directional light sources, e.g., configured to provide animation, as described above. Animation may comprise a shift in an apparent location of the multiview image during the first and second time periods, according to some embodiments.

Thus, there have been described examples and embodiments of a static multiview display and a method of static multiview display operation having diffraction gratings configured to provide a plurality of directional light beams representing a static or quasi-static multiview image from guided light beams having different radial directions from one another, which are provided by a horizontal diffuser and a directional light source. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A static multiview display comprising:
a light guide configured to guide light beams;
a directional light source configured to provide directional light collimated in a vertical direction;
a horizontal diffuser between the directional light source and the light guide, the horizontal diffuser being configured to provide, from the directional light, a plurality of guided light beams within the light guide, guided light beams of the guided light beam plurality having radial directions different from one another in a horizontal direction orthogonal to the vertical direction; and
a plurality of diffraction gratings distributed across the light guide, the diffraction grating plurality being configured to scatter out light from the guided light beam plurality as directional light beams representing a static multiview image, at least two of the directional light beams having respective different intensities that correspond to respective particular view pixels of the static multiview image.

2. The static multiview display of claim 1, wherein the directional light source comprises a laser, the directional light being collimated in both the vertical direction and horizontal direction.

3. The static multiview display of claim 1, wherein the directional light source has a tilt angle in the vertical direction, the tilt angle being configured to provide the directional light having a non-zero propagation angle in the vertical direction.

4. The static multiview display of claim 1, wherein the horizontal diffuser is further configured to tilt the directional light to provide guided light beams of the guided light beam plurality having a non-zero propagation angle in the vertical direction within the light guide.

5. The static multiview display of claim 1, wherein the light guide comprises an input surface having a shape configured to provide guided light beams of the guided light beam plurality having a non-zero propagation angle in the vertical direction within the light guide.

6. The static multiview display of claim 1, wherein each diffraction grating of the diffraction grating plurality is configured to scatter out from a portion of a guided light beam of the guided light beam plurality a directional light beam having an intensity and a principal angular direction corresponding to an intensity and a view direction of a view pixel of the static multiview image.

7. The static multiview display of claim 6, wherein a grating characteristic of a diffraction grating of the diffraction grating plurality is configured to determine the intensity and the principal angular direction of the directional light beam, the grating characteristic being a function of both a location of the diffraction grating on a surface of the light guide and an input location of the directional light source on a side of the light guide.

8. The static multiview display of claim 7, wherein the grating characteristic comprises one or both of a grating pitch of the diffraction grating and a grating orientation of the diffraction grating, the grating characteristic being configured to determine the principal angular direction of the directional light beam provided by the diffraction grating.

9. The static multiview display of claim 7, wherein the grating characteristic comprises a grating depth configured to determine the intensity of the directional light beam provided by the diffraction grating.

10. A static multiview display comprising:
a plate light guide;
a directional light source configured to provide directional light collimated in a vertical direction;
a horizontal diffuser configured to provide a plurality of guided light beams from the directional light, guided light beams of the guided light beam plurality having both a non-zero propagation angle in the vertical direction and different radial directions from one another in a horizontal direction orthogonal to the vertical direction; and an array of multiview pixels configured to provide a static multiview image, a multiview pixel comprising a plurality of diffraction gratings configured to diffractively scatter out light from the guided light beam plurality as directional light beams representing view pixels of different views of the static multiview image, at least two of the directional light beams having respective different intensities that correspond to respective particular view pixels of the static multiview image.

11. The static multiview display of claim 10, wherein a principal angular direction of a directional light beam provided by a diffraction grating of the diffraction grating plurality is a function of a grating characteristic, the grating characteristic being a function of a relative location of the diffraction grating and the directional light source.

12. The static multiview display of claim 11, wherein the grating characteristic comprises one or both of a grating pitch and a grating orientation of the diffraction grating, and wherein an intensity of the directional light beam provided by the diffraction grating and corresponding to an intensity of a corresponding view pixel is determined by a diffractive coupling efficiency of the diffraction grating.

13. The static multiview display of claim 10, wherein the directional light source comprises a laser, the directional light being collimated in both the vertical direction and horizontal direction at an output of the laser.

14. The static multiview display of claim 10, wherein the directional light source has a tilt angle in the vertical direction, the tilt angle being configured to provide the directional light having the non-zero propagation angle in the vertical direction.

15. The static multiview display of claim 10, wherein the horizontal diffuser is further configured to tilt the directional light to provide the guided light beams of the guided light beam plurality having the non-zero propagation angle in the vertical direction within the plate light guide.

16. The static multiview display of claim 10, wherein the plate light guide comprises an input surface at an input end having a shape configured to provide the guided light beams of the guided light beam plurality having the non-zero propagation angle in the vertical direction within the plate light guide.

17. A method of static multiview display operation, the method comprising:
providing directional light using a directional light source, the directional light being collimated in a vertical direction;
diffusing the directional light using a horizontal diffuser to provide a plurality of guided light beams within a light guide, guided light beams of the guided light beam plurality having radial directions different from one another in a horizontal direction orthogonal to the vertical direction; and
scattering out light from the guided light beam plurality as directional light beams using a plurality of diffraction gratings distributed across the light guide, the directional light beams representing view pixels of a static multiview image, at least two of the directional light beams having respective different intensities that correspond to respective particular view pixels of the static multiview image.

18. The method of static multiview display operation of claim 17, wherein an intensity and a principal angular direction of a directional light beam of the directional light beams are controlled by a grating characteristic of a diffraction grating that is based on a location of the diffraction grating relative to a location of the directional light source at an input of the light guide, the grating characteristic controlling the principal angular direction comprising one or both of a grating pitch and a grating orientation of the diffraction grating.

19. The method of static multiview display operation of claim 17, further comprising providing the plurality of guided light beams at a non-zero propagation angle within the light guide, the non-zero propagation angle being an angle in the vertical direction.

20. The method of static multiview display operation of claim 19, wherein the non-zero propagation angle is provided by one or more of tilting the directional light source in the vertical direction, tilting the directional light using the horizontal diffuser, and tilting the guided light beams of the guided light beam plurality at an output of the horizontal diffuser using a shape of an input surface of the light guide that receives the guided light beam plurality.

* * * * *